(12) United States Patent
Suk et al.

(10) Patent No.: US 8,520,893 B2
(45) Date of Patent: Aug. 27, 2013

(54) METHOD AND SYSTEM FOR DETECTING OBJECT

(75) Inventors: Jung Hee Suk, Daejeon (KR); Chun Gi Lyuh, Daejeon (KR); Ik Jae Chun, Daejeon (KR); Jeong Hwan Lee, Daegu (KR); Jae Chang Shim, Andong (KR); Mi Soon Choi, Andong (KR); Wook Jin Chung, Andong (KR); Yeung Hak Lee, Daegu (KR); Tae Moon Roh, Daejeon (KR)

(73) Assignees: Electronics and Telecommunications Research Institute, Daejeon (KR); Andong University Industry-Academic Cooperation Foundation, Andong (KR)

( * ) Notice: Subject to any disclaimer, the term of this patent is extended or adjusted under 35 U.S.C. 154(b) by 210 days.

(21) Appl. No.: 12/949,438

(22) Filed: Nov. 18, 2010

(65) Prior Publication Data

US 2012/0076408 A1    Mar. 29, 2012

(30) Foreign Application Priority Data

Sep. 29, 2010    (KR) .................. 10-2010-0094451

(51) Int. Cl.
 *G06K 9/00* (2006.01)
 *H04N 7/12* (2006.01)
(52) U.S. Cl.
 USPC ................... 382/103; 382/191; 348/143
(58) Field of Classification Search
 USPC .............. 382/104, 318, 319, 133; 250/205
 See application file for complete search history.

(56) References Cited

U.S. PATENT DOCUMENTS

| | | | | |
|---|---|---|---|---|
| 5,757,953 | A * | 5/1998 | Jang | 382/132 |
| 5,819,247 | A * | 10/1998 | Freund et al. | 706/25 |
| 6,556,692 | B1 * | 4/2003 | Gavrila | 382/104 |
| 6,895,115 | B2 * | 5/2005 | Tilton | 382/180 |
| 2002/0057838 | A1 * | 5/2002 | Steger | 382/197 |
| 2008/0056619 | A1 * | 3/2008 | Ujisato et al. | 382/305 |

(Continued)

FOREIGN PATENT DOCUMENTS

| | | |
|---|---|---|
| JP | 2003-061101 A | 2/2003 |
| KR | 100229810 B1 | 8/1999 |

(Continued)

OTHER PUBLICATIONS

Ho-Sik Park et al., "Object Recognition and Tracking using Histogram Through Successive Frames", The Journal of Korea Information and Communications Society, Mar. 6, 2009, pp. 274-278, vol. 34, No. 3.

(Continued)

*Primary Examiner* — Manav Seth

(57) ABSTRACT

Provided are a system and method for detecting an object. The method includes selecting a macroscopic scan mode in which there are a small number of divided regions or a microscopic scan mode in which there are a large number of divided regions according to complexity of a background including an object to be detected, dividing an input image into one or more regions according to the selected scan mode, merging adjacent regions having similar characteristics among the divided regions, extracting a search region by excluding a region having a high probability that the object to be detected does not exist from the divided or merged regions, extracting feature data including a feature vector for detecting the object in the search region, and detecting the object in the search region using the extracted feature data.

16 Claims, 15 Drawing Sheets

(56) References Cited

U.S. PATENT DOCUMENTS

2009/0185715 A1* 7/2009 Hofhauser et al. ............ 382/103
2010/0201682 A1* 8/2010 Quan et al. ................... 345/419
2011/0293173 A1* 12/2011 Porikli et al. ................ 382/159

FOREIGN PATENT DOCUMENTS

| KR | 1020050112219 A | 11/2005 |
| KR | 1020060020998 A | 3/2006 |
| KR | 1020060054540 A | 5/2006 |
| KR | 1020090082798 A | 7/2009 |
| KR | 1020100043883 A | 4/2010 |

OTHER PUBLICATIONS

Jeong-Hwan Lee et al., "Vehicle Detection Based on the Boosting Classifier and Image Segmentation", Proceedings of the Korea Multimedia Society Conference, 2009, pp. 548-550, vol. 12, No. 2.

* cited by examiner

True Positive

True Negative

False Negative

False Positive

METHOD AND SYSTEM FOR DETECTING OBJECT

CROSS-REFERENCE TO RELATED APPLICATION

This application claims priority to and the benefit of Korean Patent Application No. 10-2010-0094451, filed Sep. 29, 2010, the disclosure of which is incorporated herein by reference in its entirety.

BACKGROUND

1. Field of the Invention

The present invention relates to a method and system for detecting an object in an input image, and more particularly to a method and system dividing and merging an input image according to a predetermined criterion, detecting only a portion having a probability that an object to be detected exists, and thereby enabling high-speed processing.

2. Discussion of Related Art

With the development of image generation apparatuses such as cameras, the attraction of image-based information processing technology has been increasing recently. Particularly in the automobile field, a continuous effort is being made for high-tech car control or collision prevention using a real-time image obtained through a camera installed at the front or rear of a car. When it is possible to know whether or not an object which may disturb driving, such as another car, a pedestrian, or an animal, is in front of a car and the location of the object, a severe traffic accident can be prevented, and also the disabled can be assisted in driving. In developed countries, high-tech intelligent vehicles are being vigorously researched by large automobile manufacturing companies. In addition to the research, there is much ongoing research and development on various sensors and equipment for preventing a traffic accident which may be caused by a driver's mistake during driving and an algorithm for effectively using the sensors and equipment.

In general, an automated travel system that is embedded in a variety of a transportation means and performs automatic travel by detecting a traveling location has been mainly employed in ships and airplanes. Lately, the automated travel system has been also employed in cars traveling on roads, and informs drivers of various pieces of information such as a travel route and a degree of congestion through a monitor, or operates by itself to drive a car or control a travel state.

However, the automated travel system or an algorithm used in the system has not been commercialized yet. In the case of an object moving at a high speed such as a car, a driving environment (e.g., another car suddenly cutting in front of the car) should be recognized in real time and reported to the driver, or the system should determine a driving environment in real time to immediately take emergency actions. To this end, a method or high-performance processor capable of processing a large amount of data in real time is needed. However, it is very difficult to manufacture and design such an algorithm or processor, and to commercialize the algorithm or processor due to high production cost.

In addition, it is necessary to recognize a driving environment and detect an object such as a vehicle during movement. For this reason, it is difficult to distinguish an object such as a car and the background, and an error frequently occurs during tracking of an object. Also, a moving object is frequently misrecognized due to a change in lighting.

Consequently, there is an urgent need for development of technology which rapidly recognizes a driving environment in real time and correctly processes information about the driving environment when a car travels at a high speed, to assist a driver in driving or take an appropriate action for a current situation by itself.

SUMMARY OF THE INVENTION

The present invention is directed to dividing an image into one or more regions according to a predetermined condition, performing an object detection algorithm only on regions other than those having no probability that an object to be detected exists, and thereby detecting a specific object in the image at high speed.

The present invention is also directed to enabling rapid provision of correct information and emergency actions even in a traffic situation varying with time by applying an exemplary embodiment of the present invention to a high-tech car control system or car collision prevention system.

One aspect of the present invention provides a method of detecting an object including: selecting a macroscopic scan mode in which there are a small number of divided regions or a microscopic scan mode in which there are a large number of divided regions according to complexity of a background including an object to be detected; dividing an input image into one or more regions according to the selected scan mode; merging adjacent regions having similar characteristics among the divided regions; extracting a search region by excluding a region having a high probability that the object to be detected does not exist from the divided or merged regions; extracting feature data including a feature vector for detecting the object in the search region; and detecting the object in the search region using the extracted feature data.

Another aspect of the present invention provides a system for detecting an object including: a scan mode selector for selecting a macroscopic scan mode in which there are a small number of divided regions or a microscopic scan mode in which there are a large number of divided regions according to complexity of a background including an object to be detected; a search region extractor including a region divider for dividing an input image into one or more regions according to the selected scan mode, a region merger for merging adjacent regions having similar characteristics among the divided regions, and a region extractor for extracting a search region by excluding a region having a high probability that the object to be detected does not exist from the divided or merged regions; a feature data extractor for extracting feature data including a feature vector for detecting the object in the search region; and an object detector for detecting the object in the search region using the extracted feature data.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Hereinafter, exemplary embodiments of the present invention will be described in detail. However, the present invention is not limited to the embodiments disclosed below but can be implemented in various forms. The following embodiments are described in order to enable those of ordinary skill in the art to embody and practice the present invention. To clearly describe the present invention, parts not relating to the description are omitted from the drawings. Like numerals refer to like elements throughout the description of the drawings.

<Constitution of Whole System>

Figure 1:
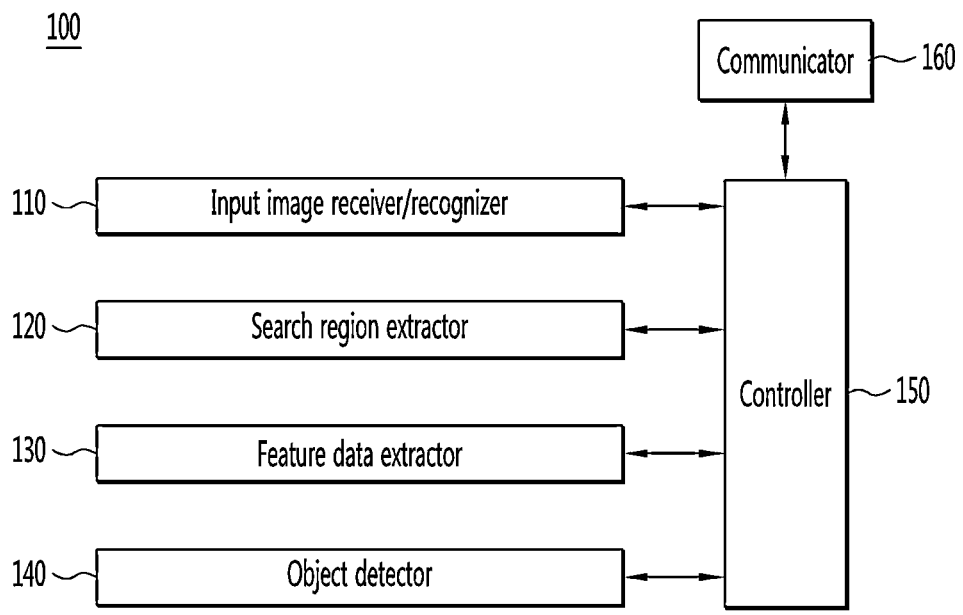
FIG. 1 is a block diagram of a system for detecting an object according to an exemplary embodiment of the present invention.

FIG. 1 is a block diagram of a system for detecting an object according to an exemplary embodiment of the present invention.

Referring to FIG. 1, a system 100 for detecting an object according to an exemplary embodiment of the present invention may include an input image information receiver/recognizer 110, a search region extractor 120, a feature data extractor 130, an object detector 140, a controller 150, and a communicator 160. In an exemplary embodiment of the present invention, at least some of the input image information receiver/recognizer 110, the search region extractor 120, the feature data extractor 130, the object detector 140, the controller 150, and the communicator 160 may be program modules communicating with the system 100 for detecting an object (however, FIG. 1 shows an example in which the input image information receiver/recognizer 110, the search region extractor 120, the feature data extractor 130, the object detector 140, the controller 150, and the communicator 160 are included in the system 100 for detecting an object). As an operating system (OS), an application module, and another program module, these program modules may be included in the system 100 for detecting an object, and may be physically stored in several well-known memories. Also, the program modules may be stored in a remote memory capable of communicating with the system 100 for detecting an object. The program modules include a routine, a subroutine, a program, an object, a component, a data structure, etc. performing a specific task to be described later or executing a specific type of abstract data according to an exemplary embodiment of the present invention, but are not limited to these.

The system 100 for detecting an object according to an exemplary embodiment of the present invention is a system for detecting a moving object from image information obtained by a predetermined method as described below, which may be included in or directly connected with an image data generation apparatus such as a camera installed in a car, etc.

The input image information receiver/recognizer 110 according to an exemplary embodiment of the present invention serves to receive and recognize image information generated by an image data generation apparatus such as a camera. For example, when a camera installed in a car takes a picture of surroundings during movement, the corresponding image information can be received and recognized.

The search region extractor 120 according to an exemplary embodiment of the present invention serves to divide and merge the image information received and recognized by the input image information receiver/recognizer 110 and extract a region in which an object to be detected will be searched for.

Figure 2:
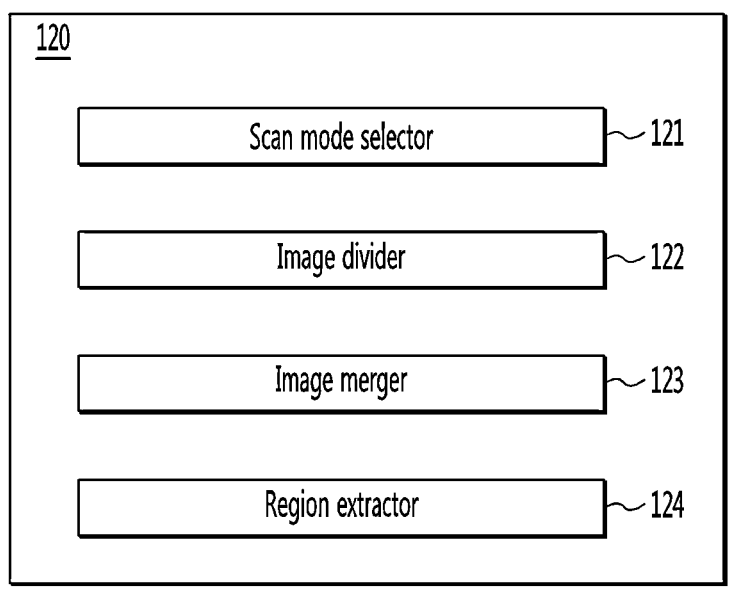
FIG. 2 is a block diagram of a search region extractor according to an exemplary embodiment of the present invention.

FIG. 2 is a block diagram of the search region extractor 120. A constitution and operation of the search region extractor 120 will be described in detail below with reference to FIG. 2.

Referring to FIG. 2, the search region extractor 120 according to an exemplary embodiment of the present invention may include a scan mode selector 121, an image divider 122, an image merger 123, and a region extractor 124.

The scan mode selector 121 serves to select a scanning scheme for extracting a search region. According to an exemplary embodiment of the present invention, scan modes can be classified into a macroscopic scan mode and a microscopic scan mode. In the macroscopic scan mode, an average, a variance, etc. that is a setting variable for image division is set to a large value, thereby reducing the number of divided regions and increasing the number of pixels in the divided regions. On the other hand, in the microscopic scan mode, the average, variance, etc. that is a setting variable for image division is set to a small value, thereby increasing the number of divided regions and reducing the number of pixels in the divided regions. For example, when a car travels on a highway, a surrounding background photographed by a camera becomes simple. In this case, the macroscopic scan mode may be suitable. On the other hand, when a car travels in an environment having a complex background such as an urban center, the number of divided regions should be large, and the microscopic scan mode may be suitable.

Figure 3A:
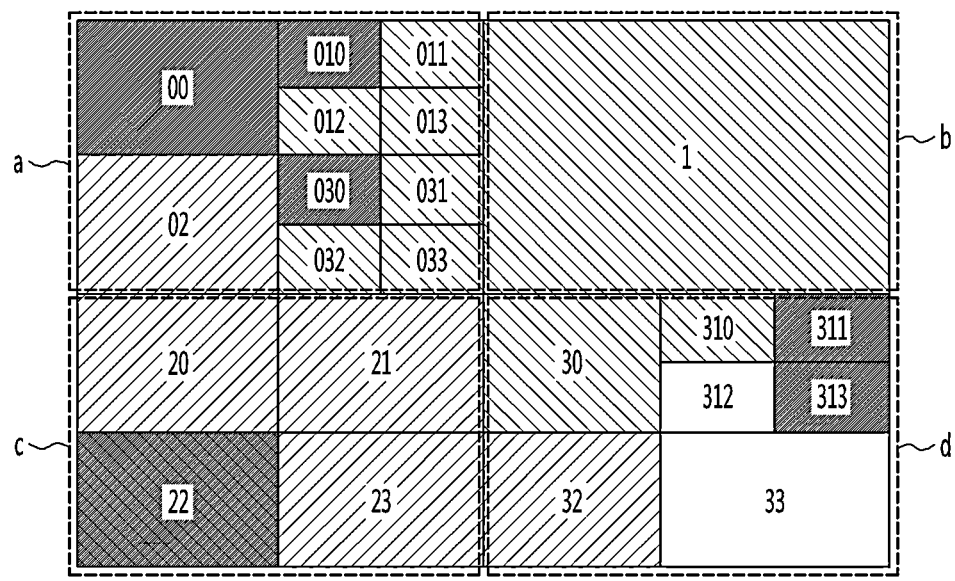
FIGS. 3A and 3B illustrate an example of an image divided and merged according to an exemplary embodiment of the present invention.
Figure 3B:
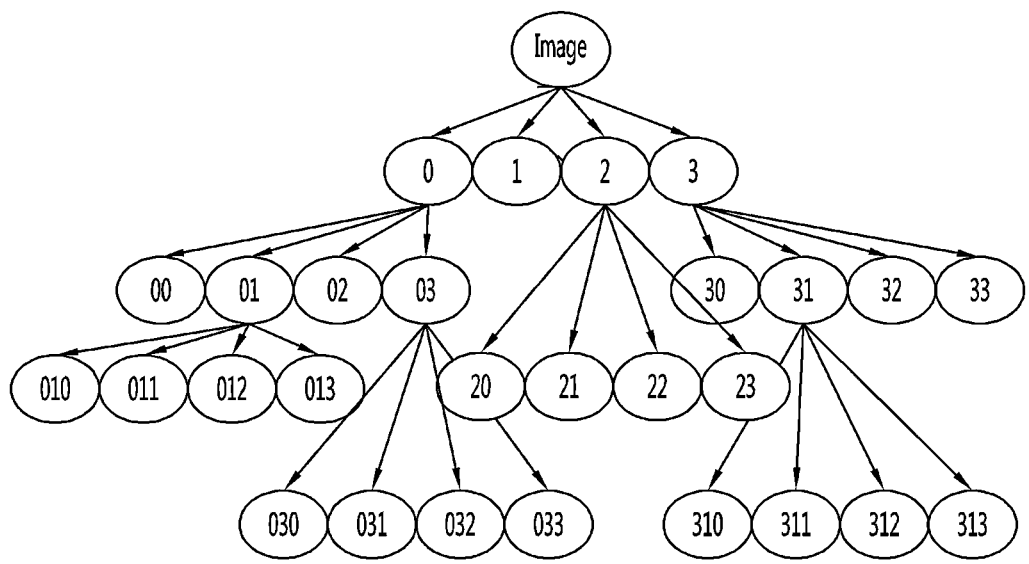

The image divider 122 serves to divide an image according to the mode selected by the scan mode selector 121. FIGS. 3A and 3B illustrate an example of an image divided and merged by the image divider 122 and the image merger 123. FIG. 3A shows an example of region division and merger in an image, and FIG. 3B shows a tree structure of divided regions of FIG. 3A. As shown in FIGS. 3A and 3B, image division begins with dividing an image into one or more regions. For example, an image can be divided into four regions a, b, c, and d as shown in FIGS. 3A and 3B. After this, each of the four regions a, b, c, and d can be continuously divided according to a predetermined criterion. Image division can be stopped when the corresponding region has a uniform feature. According to a criterion such as an average, a variance, a moment, a color, or a texture of the corresponding region, it can be determined whether or not the region has a uniform feature. For example, a region having a variance of a reference variance value or more can be determined as a non-uniform region. A region determined as a non-uniform region is continuously divided. FIGS. 3A and 3B show an example in which the regions a, c, and d are determined as non-uniform regions and divided. As mentioned above, when the divided regions are also determined as non-uniform regions, they (e.g., the regions a and d) can be continuously divided into subregions (e.g., 010, 011, 012 and 013, and 310, 311, 312 and 313). Here, the number indicating each region is a set of indices given at respective division steps. For example, the region 312 hierarchically denotes a fourth region in the first step, a second region in the next step, and a third region in the final step. When all regions divided in this way are determined to have a uniform feature, division is stopped.

The image merger 123 serves to merge the regions divided by the image divider 122. When divided regions adjacent to each other can be merged into a uniform region, that is, regarded as the same region, they can be merged. For example, a difference in feature, such as pixels, between divided adjacent regions is calculated, and when the difference is a predetermined reference value or less, the adjacent regions can be merged. Such a merger is not finished at once, and merged regions can also be continuously merged. Regions indicated by the same pattern in FIG. 3A denote regions merged by the image merger 123.

The region extractor 124 serves to extract only a portion that needs to be searched for an object from the image divided and merged by the image divider 122 and the image merger 123. For example, when an object, a car, needs to be detected in an image photographed during a car drive, the image may include asphalt, a car, a centerline, a tree, a forest, a guardrail, the sky, and so on. Here, it is quite possible that a wide region of the same color in the divided and merged image is a portion unrelated to a car, such as asphalt or the sky, and the region can be excluded from search regions. In this way, that is, by excluding a region having a high probability that an object to be detected does not exist, a final search region can be extracted. In this way, only a region having a high probability that an object exists is searched, so that a high-speed algorithm can be implemented.

The image divider 122 and the image merger 123 according to an exemplary embodiment of the present invention can perform a division and merger in a hierarchical structure using 2×2 region units as the minimum region units. According to an exemplary embodiment of the present invention, the image divider 122 and the image merger 123 can be easily realized as hardware and also as a system on chip (SoC).

The feature data extractor 130 according to an exemplary embodiment of the present invention serves to extract feature data, that is, information including a feature vector, for detecting an object in a region extracted by the search region extractor 120. To extract feature data, general schemes (e.g., the histogram of oriented gradient (HOG) algorithm, the Gabor filter, the Haar-like transform, a wavelet transform, a color, a texture, and a stereo) can be used. In an exemplary embodiment of the present invention, the HOG algorithm will be used.

In the HOG algorithm, an image is divided into a grid of square cells, and a distribution direction of brightness in each cell is calculated as a local histogram, which is used as a feature vector.

To obtain a feature vector, a slope value and a direction value of brightness distribution need to be calculated first. When a brightness value of each pixel is $f(i,j)$, a slope $m(i,j)$ and a direction $\theta(i,j)$ are expressed as follows:

$$m(i, j) = \sqrt{H(i, j)^2 + V(i, j)^2}$$
$$\theta(i, j) = \tan^{-1} \frac{V(i, j)}{H(i, j)}$$
[Equation 1]

Here, $H(i,j)$ and $V(i,j)$ can be expressed as follows:

$$H(i,j)=f(i+1,j)-f(i-1,j)$$
$$V(i,j)=f(i,j+1)-f(i,j-1)$$
[Equation 2]

Using the slope $m(i,j)$ and the direction $\theta(i,j)$, it is possible to calculate a direction histogram of a brightness change in a predetermined region (e.g., an 8×8 cell region). The direction $\theta(i,j)$ can be a value ranging from 0° to 360°, but may be calculated to be a value ranging only from 0° to 180° in consideration of a direction of the slope $m(i,j)$. Thus, the direction $\theta(i,j)$ may be divided into nine directions to calculate a histogram.

After the histogram is obtained, normalization is performed. A feature vector is obtained by performing a hierarchical processing scheme on a local region, and the normalization process can be the final step. First, a predetermined number of cells (e.g., 3×3 cells) are grouped as one block. Since a direction histogram of nine directions is calculated for one cell and there are nine cells in one block consisting of 3×3 cells, a feature vector of the one block has 81 dimensions. A feature vector of each block can be normalized by Equation 3 below.

$$p = \frac{p}{\sqrt{\sum_{i=0}^{k} p_i^2 + \varepsilon^2}}$$
[Equation 3]

Here, $k$ denotes a dimension number of a feature vector in a block, and $\varepsilon$ is a value of one for preventing the denominator from becoming zero. A feature vector value of each block can be calculated while moving by one cell along a scan direction. For example, when the size of an image is 64×64×8 bits, the number of blocks is 36 and the number of feature vector dimensions of one block is 81. Thus, the number of all feature vectors per input image is 2916 (=81×36).

Meanwhile, the object detector 140 according to an exemplary embodiment of the present invention serves to finally detect the object in the image on the basis of the feature data extracted by the feature data extractor 130. Several algorithms can be used for detecting an object, but a boosting classification-based model, particularly, the AdaBoost algorithm proposed by Freund and Schapire, is used in an exemplary embodiment of the present invention.

The AdaBoost algorithm detects a target object using positive and negative example images of the detection-target object. A target training scheme and a target detection scheme of an AdaBoost-trained classifier are disclosed in a well-known paper "Rapid object detection using a boosted cascade of simple features" by P. Viola and M. Jones, In Proc. of IEEE Computer Society Conference on Computer Vision and Pattern Recognition, Kauai, Hi., 12-14, 2001.

The AdaBoost algorithm detects an object using weak classifiers and strong classifiers. In general, the AdaBoost algorithm can include many steps to reduce an error value while detecting an object, and a strong classifier can be prepared in each step. Each strong classifier remembers the location and size of an object classified as a target as detection results. Such a strong classifier is a linear combination of weak classifiers, and generally used to distinguish two classes from each other. The weak classifier selects one feature whereby pieces of training data including an object to be detected and a non-object (e.g., a car image and a non-car image) can be best classified. Such a weak classifier can be expressed by Equation 4 below.

$$h_j(x) = \begin{cases} 1 & \text{if } p_j(x) < \delta_j \\ 0 & \text{if } p_j(x) \geq \delta_j \end{cases} \quad \text{[Equation 4]}$$

Here, $h_j(x)$ denotes a weak classifier, $p_j(x)$ denotes a feature value, $\delta_j(x)$ denotes a threshold, and x denotes a training image. As mentioned above, a strong classifier is a linear combination of several weak classifiers, and distinguishes a detection-target object and a non-detection-target object (e.g., a car image and a non-car image) with reference to feature data extracted by the feature data extractor 130. In other words, after a weak classifier is trained, a low error weight is given to correctly classified data, a high error weight is given to incorrectly classified data, and a weight is repeatedly updated until a condition is satisfied.

A training process of the AdaBoost algorithm used in an exemplary embodiment of the present invention will be described below. For convenience, it is assumed that an object to be detected is a car.

First, N input images are prepared. The N input images can be expressed as $(x1, y1), \ldots,$ and $(xN, yN)$, where $xi \in X$ and $yi \in Y$. It is assumed that an input value x is a 64×64 training image, and yi is a value of +1 when it indicates a car image and a value of −1 when it indicates a non-car image. In other words, $Y=\{-1, +1\}$.

After this, an initial weight $D_1$ is calculated. An $i^{th}$ weight can be expressed as $D_i(i)=1/m$, where $i=1, \ldots,$ and N, and m is the number of positive values of Y.

Subsequently, a weak classifier having the minimum error value is selected, and a weight for the selected weak classifier is updated, so that a weak classifier is generated. This step can be performed by repeatedly carrying out the following process T times. First, a value $h_j$ for minimizing an error value $\epsilon_j$ expressed by Equation 5 below is calculated.

$$\varepsilon_j = \sum_i^m D_t(i) |h_j(x_i) - y_i| \quad \text{[Equation 5]}$$

Here, $t=1, \ldots,$ and T, and $j=1, \ldots,$ and "the number of initial features." The value $h_j$ for minimizing the error value $\epsilon_j$ will be expressed as $(\epsilon_t, h_t)$ below.

After this, a weight is calculated by Equation 6 below.

$$\alpha_t = \frac{1}{2} \ln\left(\frac{1-\varepsilon_t}{\varepsilon_t}\right) \quad \text{[Equation 6]}$$

After the weight is calculated, a weight $D_{t+1}$ is updated as shown in Equation 7 below.

$$D_{t+1}(i) = D_t(i) \cdot \begin{cases} e^{-\alpha_t} & \text{if } h_t(x_i) = y_i \\ e^{\alpha_t} & \text{if } h_t(x_i) \neq y_i \end{cases} \quad \text{[Equation 7]}$$

After the above process is repeated T times, a final strong classifier is generated as shown in Equation 8 below.

$$H(x) = \text{sign}\left(\sum_{t=1}^{T} \alpha_t h_t(x)\right) \quad \text{[Equation 8]}$$

In this way, features playing a central role in distinguishing an object to be detected and others can be selected, and a strong classifier as mentioned above can be regarded as a linear combination of such features. Thus, using a strong classifier obtained as described above, it is possible to determine whether or not an image includes an object to be detected.

The object detector 140 according to an exemplary embodiment of the present invention finds an object in an image in real time using a strong classifier obtained as described above. For example, the object may be a car, and the object detector 140 generates a mask having a predetermined shape (e.g., a quadrangle) using the strong classifier, and finds a feature value of an input pattern using the mask. When the found feature value satisfies a predetermined threshold, the object detector 140 can determine that the input pattern is the object to be detected.

The controller 150 according to an exemplary embodiment of the present invention serves to control data flow between the input image information receiver/recognizer 110, the search region extractor 120, the feature data extractor 130, the object detector 140, and the communicator 160.

The communicator 160 according to an exemplary embodiment of the present invention serves to enable the system 100 for detecting an object to communicate with an external apparatus, etc.

<Object Detection Process>

A process in which the system 100 for detecting an object according to an exemplary embodiment of the present invention detects an object will be described below with reference to FIG. 4. For convenience, it is assumed that an image in which an object will be detected is taken by an apparatus such as a camera installed at the front or rear of a car, and a detection-target object is a car in the image.

Figure 4A:
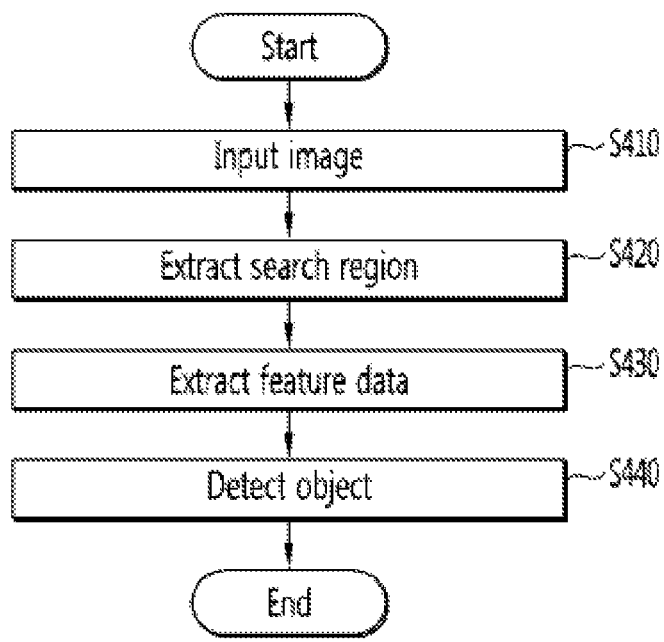
FIGS. 4A and 4B are flowcharts illustrating a process of detecting an object according to an exemplary embodiment of the present invention.

Referring to FIG. 4A, an image is input to the system 100 for detecting an object (S410). The image can be input to the input image information receiver/recognizer 110 of the system 100 for detecting an object. Subsequently, a search region is extracted from the input image (S420). The extraction of a search region can be performed by the search region extractor 120.

Figure 4B:
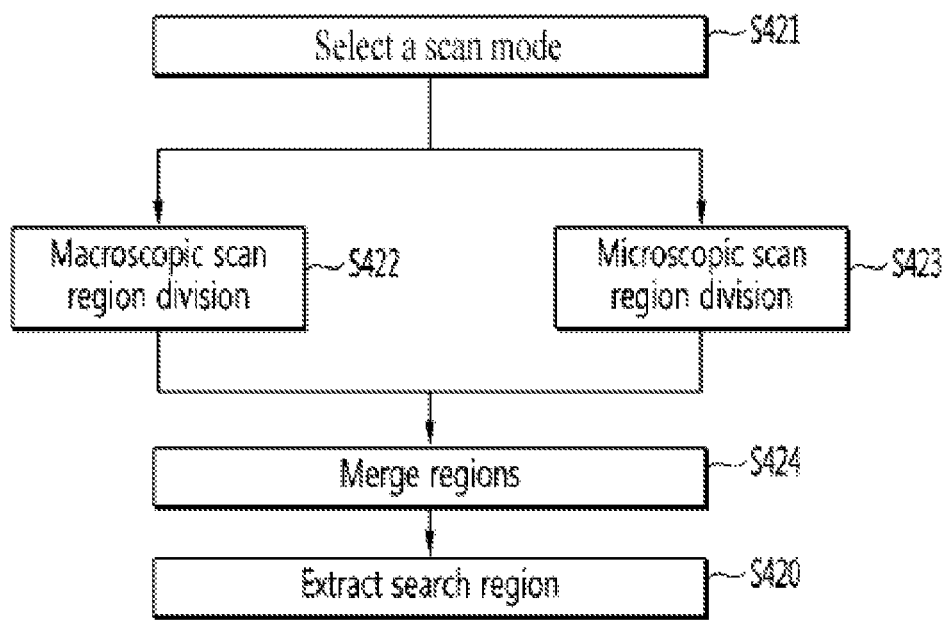

FIG. 4B illustrates a process in which the search region extractor 120 extracts a search region from an input image. First, the search region extractor 120 selects a scanning scheme for extracting a search region, that is, a scan mode (S421). Scan modes can be classified into the macroscopic scan mode and the microscopic scan mode. The respective scan modes have been described above, and the description will not be reiterated. After selecting a scan mode, the search region extractor 120 sets a variable according to the selected mode and divides the image (S422 or S423). Subsequently, the search region extractor 120 again merges adjacent regions determined to have the same characteristic among the divided regions (S424). After merging adjacent regions having the same characteristic, the search region extractor 120 excludes a region having a low probability that the object to be detected exists, finally extracting only a region to be searched (S420).

After extracting of the search region is completed, feature data for detecting the object in the image is extracted (S430). As described above, the HOG algorithm is used to extract feature data in an exemplary embodiment of the present invention. After feature data is extracted, the object is finally detected by the AdaBoost algorithm, and so on (S440).

<Performance and Implemented Example>

Figure 5:
FIG. 5 shows part of training images used when an object detector according to an exemplary embodiment of the present invention generates a classifier.

To evaluate performance of an object detection algorithm proposed by an exemplary embodiment of the present invention, a simulation was performed using an image of a car traveling on a road and front and rear images of a parked car. In the AdaBoost algorithm executed by the object detector 140 according to an exemplary embodiment of the present invention, a total of 237 car images including 137 front images and 100 rear images were used for training to generate a classifier, and 300 non-car images were used for evaluating a recognition rate. That is, a total number of the training images was 537. Also, the images had a size of 64×64×8 bits. FIG. 5 shows part of training images used when the object detector 140 according to an exemplary embodiment of the present invention generates a classifier.

To evaluate a classifier generated by the object detector 140, 1037 images were used. Among these images, the above-mentioned 537 images were used for training, but the other 500 images were not.

Tables 1 and 2 below show results of object classification using the training images and the non-training images as input images, respectively.

TABLE 1

| Using Training Images and | Classification Result (%) | |
|---|---|---|
| 15876 HOG Features | Car | Non-Car |
| 537 Training Images | 237 Car Images | 100 | 0.0 |
| | 300 Non-Car Images | 0.0 | 100 |

TABLE 2

| Using Non-Training Images and | Classification Result (%) | |
|---|---|---|
| 15876 HOG Features | Car | Non-Car |
| 500 Non-Training Images | 200 Car Images | 97.00 | 3.00 |
| | 300 Non-Car Images | 0.33 | 99.67 |

Referring to Tables 1 and 2, true positive (a case in which a car is recognized as a car) and true negative (a case in which a non-car is recognized as a non-car) rates of 100% are obtained as results of classifying the training images. On the other hand, as results of classifying the non-training images, a false positive (a case in which a non-car is recognized as a car) rate is 0.33%, a false negative (a case in which a car is recognized as a non-car) rate is 3.0%, a true positive rate is 97.00%, and a true negative rate is 99.67%.

Figure 6A:
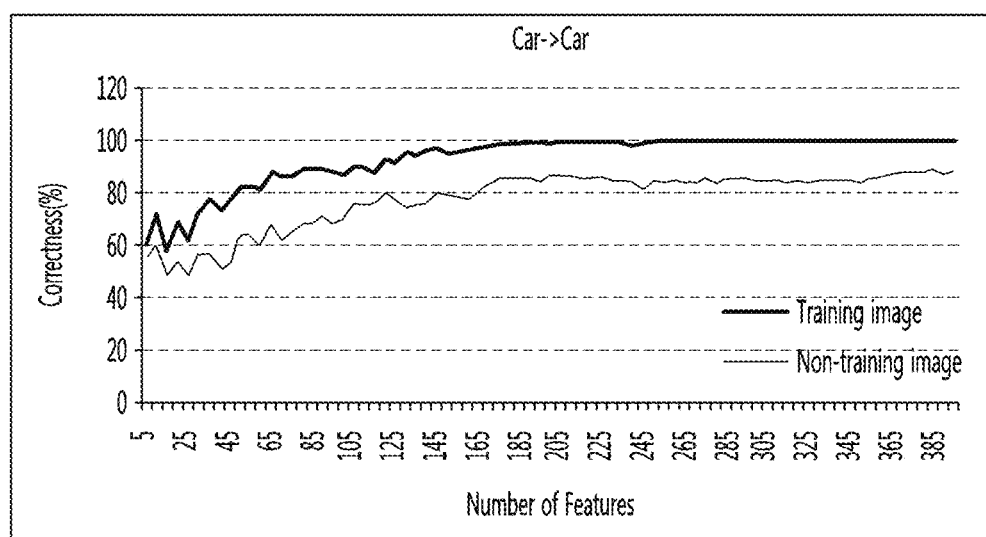
FIGS. 6A to 6E are graphs showing object detection results and error rates obtained from training images and non-training images.
Figure 6B:
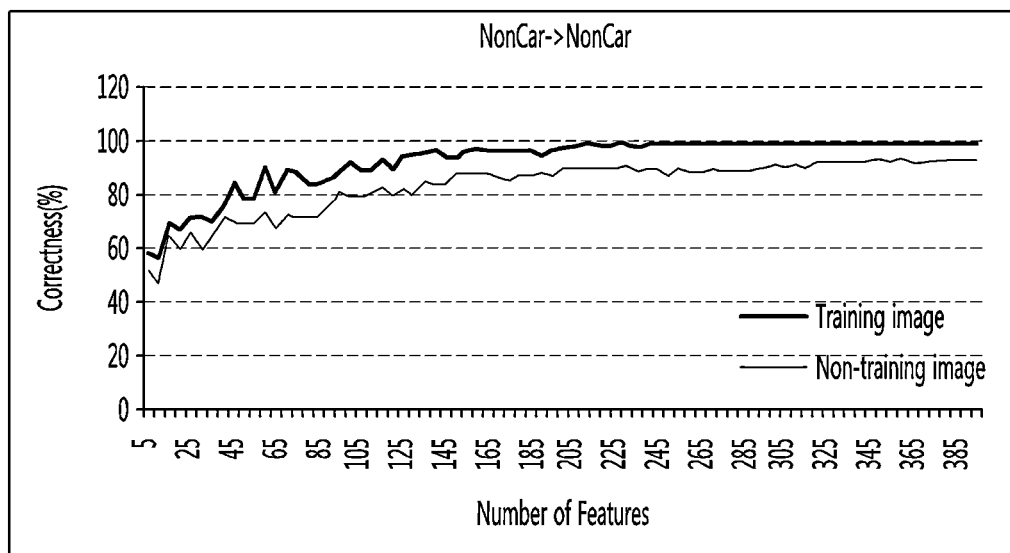
Figure 6C:
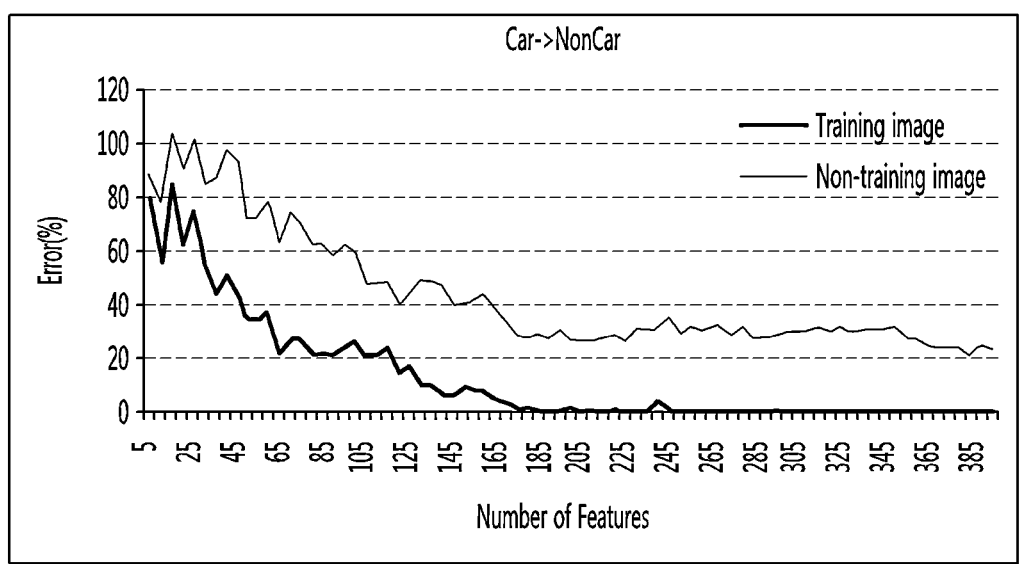
Figure 6D:
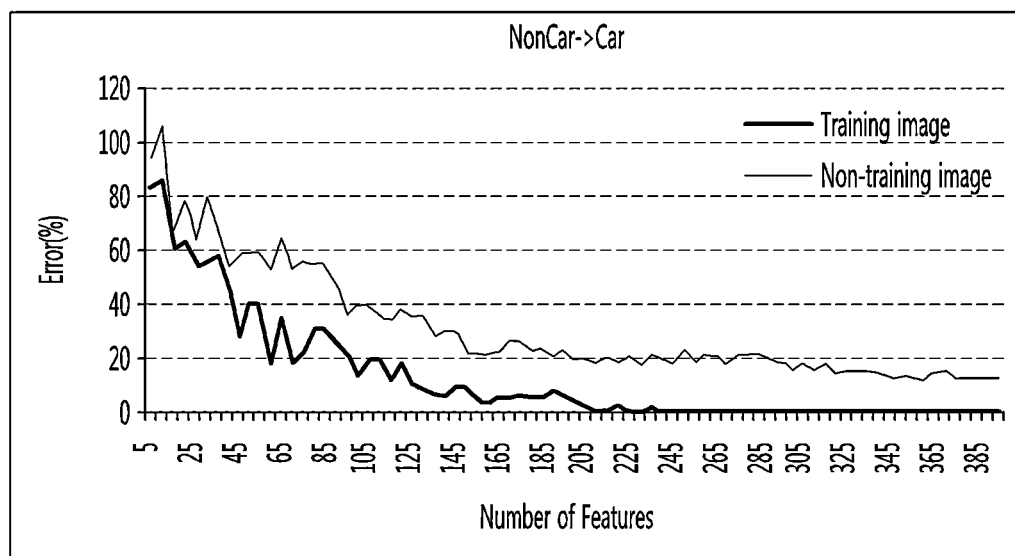
Figure 6E:
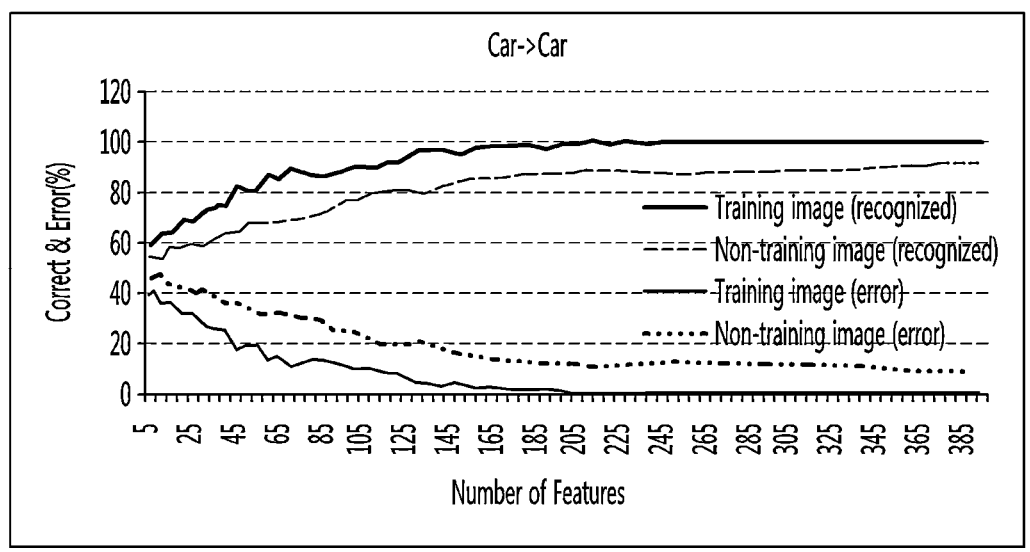

FIGS. 6A to 6E are graphs showing object detection results and error rates obtained from training images and non-training images. FIGS. 6A to 6D are graphs respectively showing true positive, true negative, false positive, and false negative rates of training images and non-training images versus number of feature vectors, and FIG. 6E is a graph showing a detection rate and error rate obtained from training images and non-training images.

As can be seen from FIGS. 6A to 6E, detection results obtained from training images are superior to those obtained from non-training images. In other words, when there are enough feature vectors, true positive and true negative rates of 100% are obtained from the training images. However, even when there are enough feature vectors, the non-training images do not show true positive and true negative rates of 100%, and have a lower recognition rate than the training images. To be specific, when the number of feature vectors is about 400, the training images show a recognition rate of 100%, but the non-training images show a recognition rate of 93%. In particular, the training images show a false positive rate of 0% from when the number of feature vectors is 240.

Figure 7A:
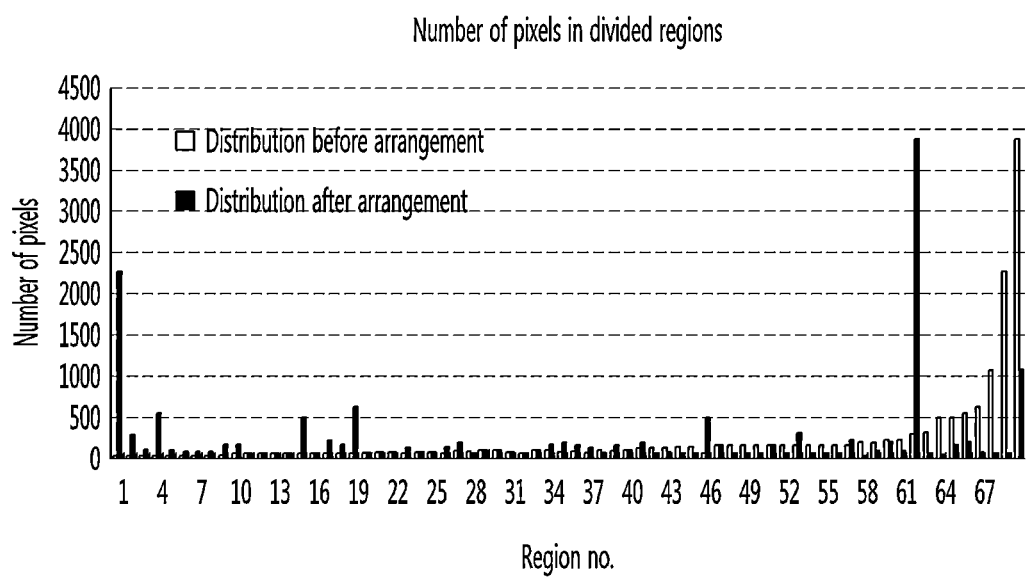
FIG. 7A is a graph showing the number of pixels of a region obtained by dividing a predetermined image according to an exemplary embodiment of the present invention.

FIG. 7A is a graph showing the number of pixels of a region obtained by dividing an image to extract a search region. Here, the horizontal axis indicates region numbers, and distributions before and after sizes of regions are arranged are shown together. Since it is quite possible that a region having the number of pixels of a predetermined value or more is a portion unrelated to object detection (e.g., asphalt or the sky), such a portion is excluded to extract a search region in an exemplary embodiment of the present invention.

Figure 7B:
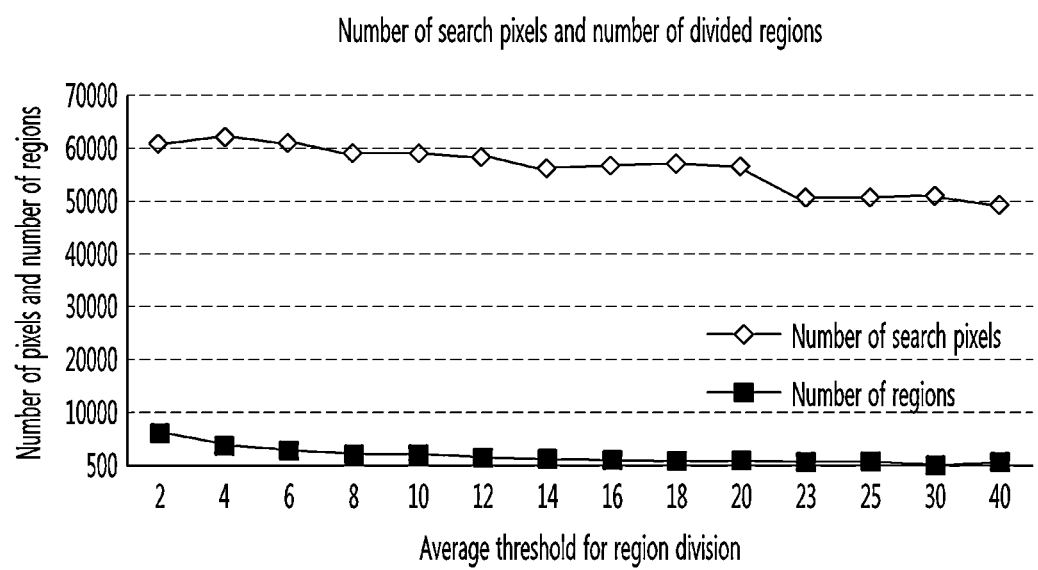
FIG. 7B is a graph showing the number of pixels and the number of divided regions to be searched according to a change of an average threshold specified for region division according to an exemplary embodiment of the present invention.
Figure 8A:
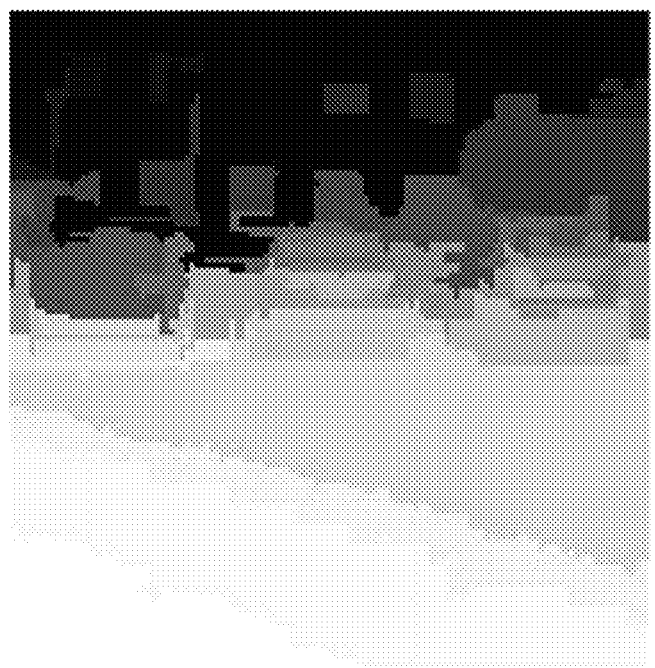
FIGS. 8 to 11 show simulation results of a method of detecting an object according to an exemplary embodiment of the present invention.
Figure 8B:
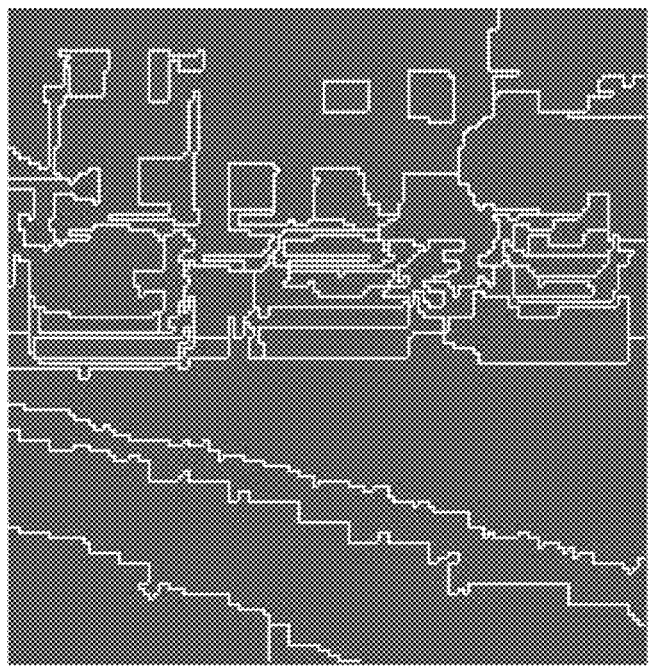
Figure 8C:
Figure 8C:
Figure 8D:
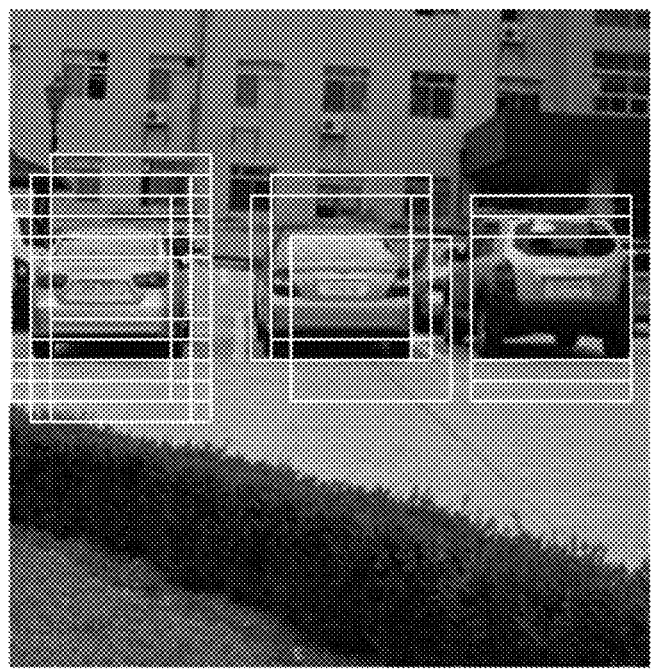
Figure 9A:
Figure 9B:
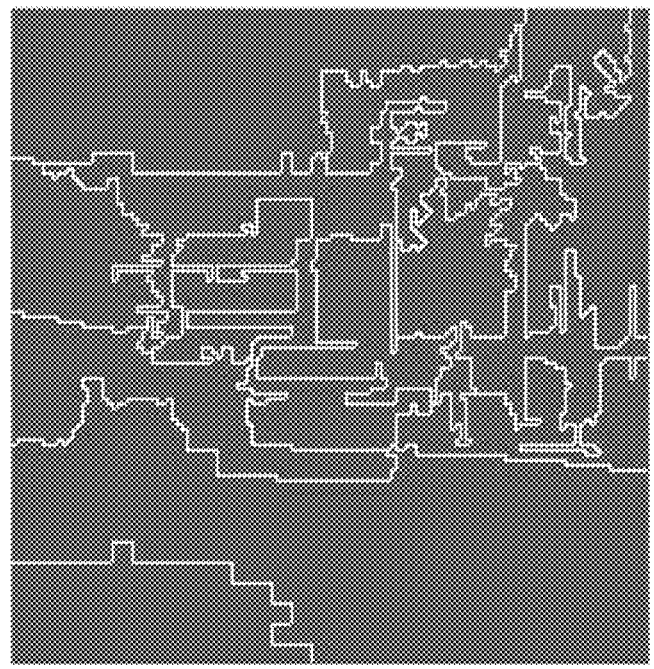
Figure 9C:
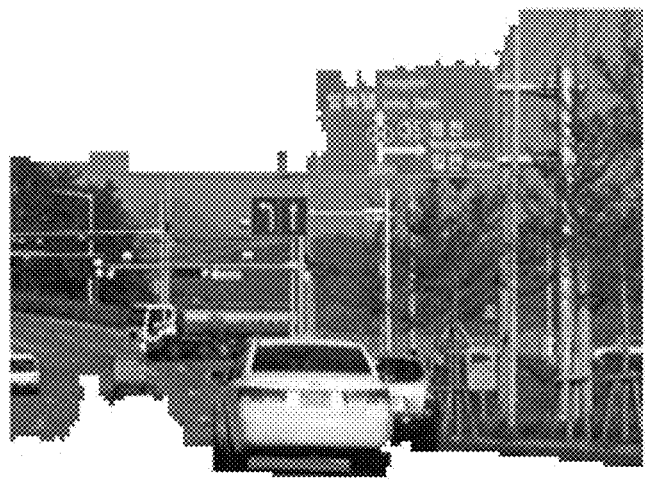
Figure 9C:
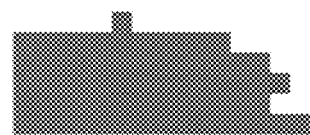
Figure 9D:
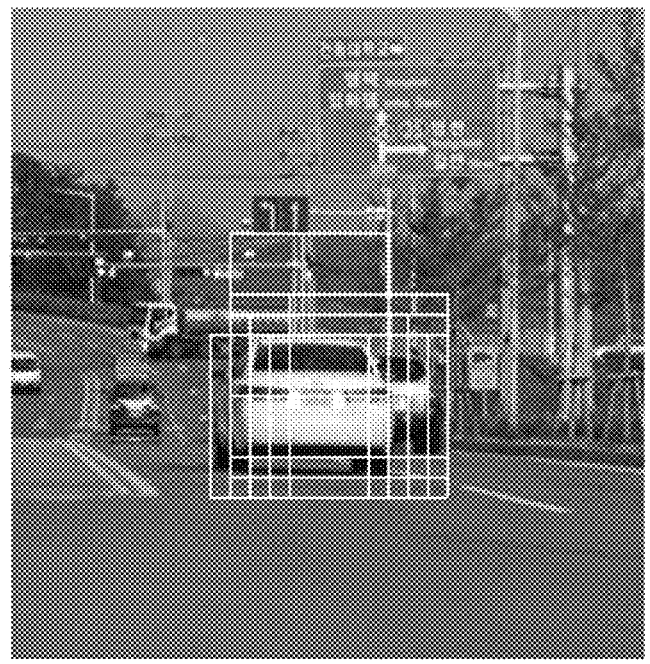
Figure 10A:
Figure 10B:
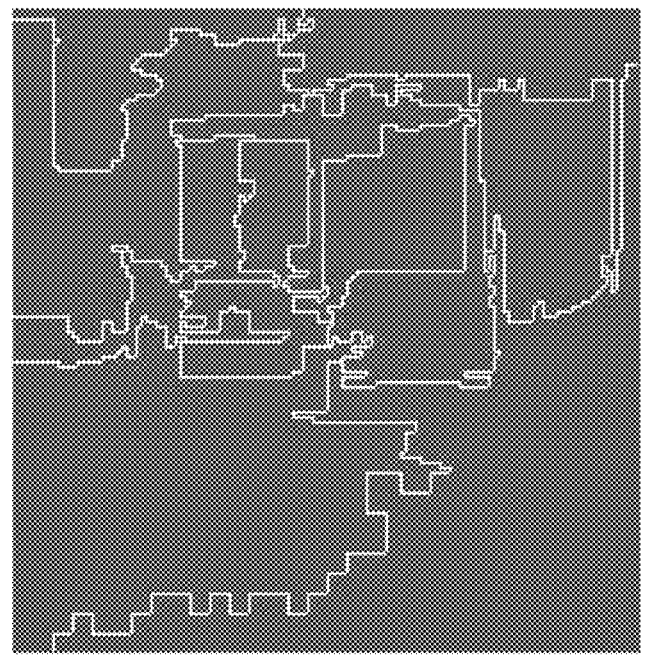
Figure 10C:
Figure 10D:
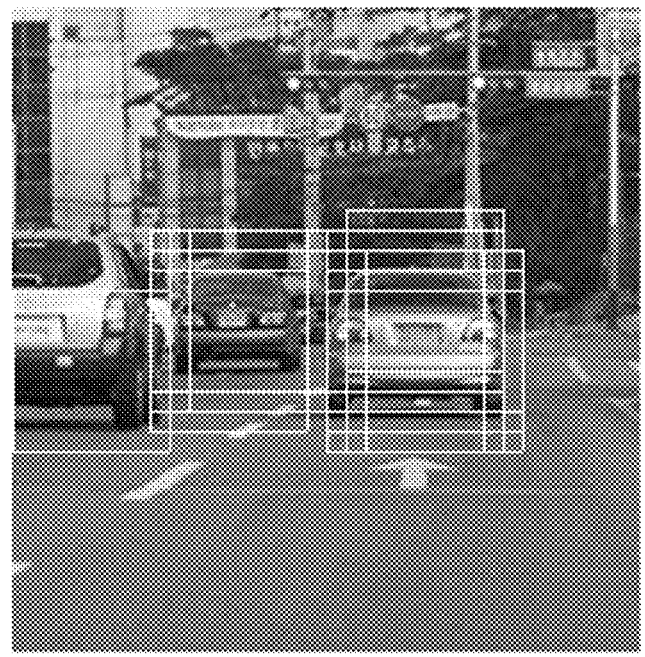
Figure 11A:
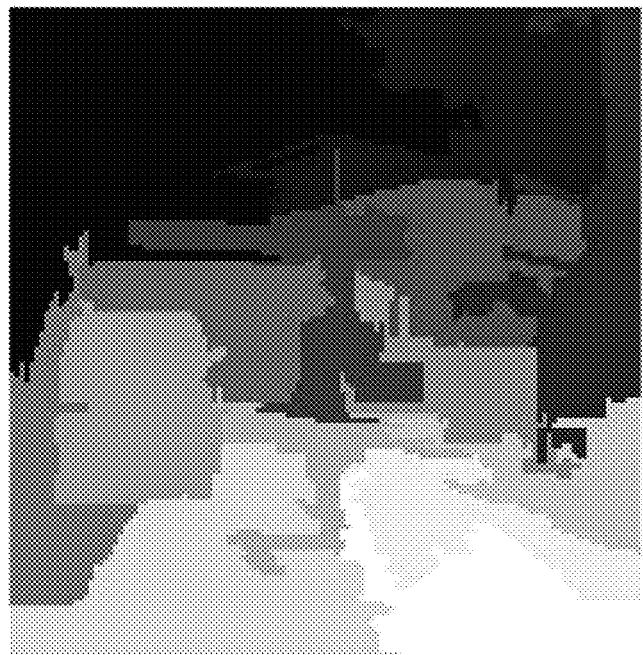
Figure 11B:
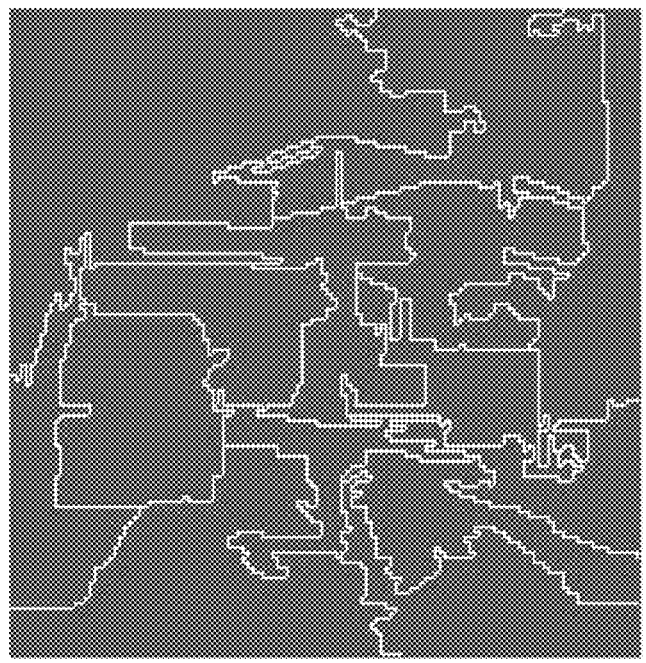
Figure 11C:
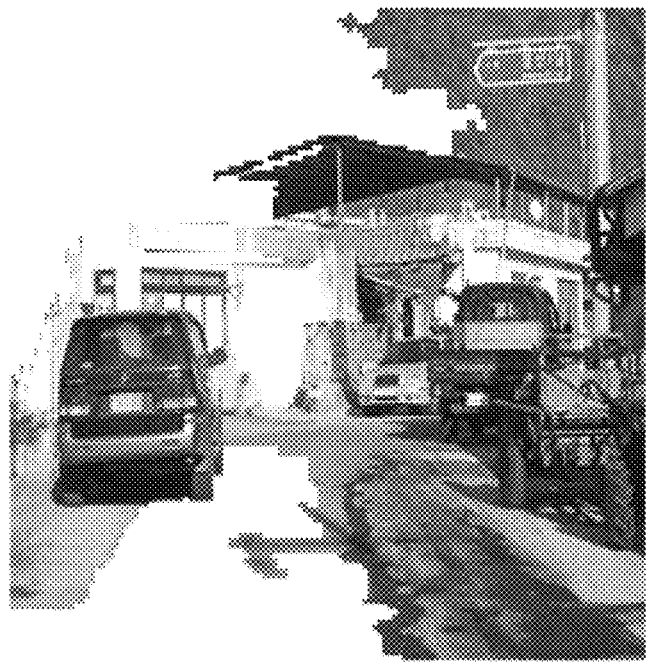
Figure 11D:
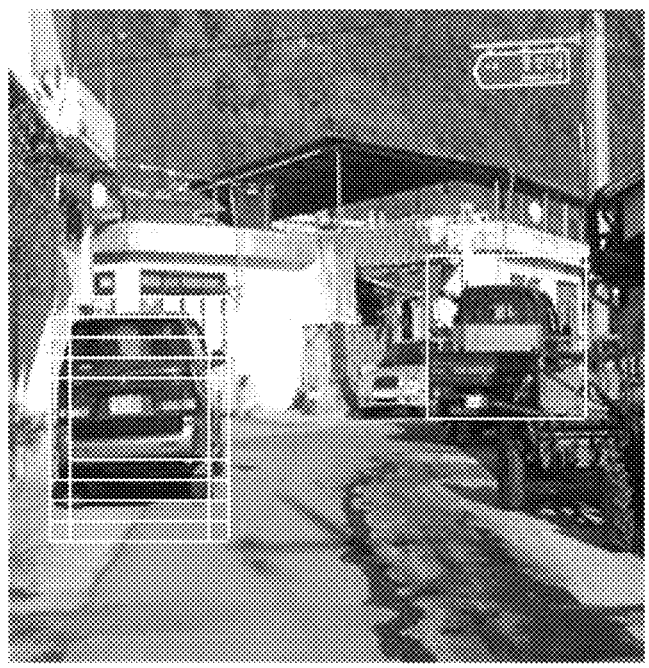

FIG. 7B is a graph showing the number of pixels to be searched and the number of divided regions according to a change of an average threshold for region division. As can be seen from FIG. 7B, the greater the number of regions, the greater the number of pixels to be searched for an object. On the other hand, the fewer the number of regions, the fewer the number of pixels to be searched. A reduction in the number of regions means that there are many regions unrelated to object detection. When these regions are excluded from search regions, the number of pixels to be searched is naturally reduced.

FIGS. 8 to 11 show simulation results of a method of detecting an object according to an exemplary embodiment of the present invention.

FIGS. 8A, 9A, 10A, and 11A show results of dividing images to extract a search region according to a predetermined scan mode, and FIGS. 8B, 9B, 10B, and 11B are diagrams showing boundaries of regions obtained by dividing the images of FIGS., 8A, 9A, 10A, and 11A, respectively. FIGS. 8C, 9C, 10C, 11C show results of extracting only portions to be searched for an object. A predetermined number of regions (e.g., two regions) may be excluded from search regions obtained by dividing the images in decreasing order of area (e.g., the number of pixels). FIGS. 8D, 9D, 10D, and 11D show regions in which an object, that is, a car, is detected together with the original images.

As described above, to detect a specific object in an image according to an exemplary embodiment of the present invention, an object detection algorithm is performed only on regions other than those having no probability that the object to be detected exists among one or more regions divided according to a predetermined condition. Thus, high-speed processing is enabled.

Also, when an exemplary embodiment of the present invention is applied to a high-tech car control system or car collision prevention system, it is possible to rapidly provide correct information and take emergency actions even in a traffic situation varying with time.

The above-described exemplary embodiments of the present invention can be implemented in the form of a program command that can be executed through a variety of computer components and recorded in a computer-readable medium. The computer-readable medium may store program commands, data files, data structures, etc. in an independent or combined form. The program command recoded in the computer-readable medium may be a command particularly designed and constructed for the present invention or a command publicized to and used by those of ordinary skill in the field of computer software. The computer-readable medium may include, for example, magnetic media such as a hard disk, a floppy disk and a magnetic tape, optical recording media such as a compact disc read-only memory (CD-ROM) and a digital versatile disc (DVD), magneto-optical media such as a floptical disk, and a hardware device particularly constructed to store and execute a program command such as a ROM, a random-access memory (RAM) and a flash memory. The program command includes, for example, machine language codes created by a compiler and also high-level language codes that can be executed by a computer using an interpreter, etc. The hardware device may be constructed to operate as one or more software modules in order to perform a process according to the present invention, and vice versa.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of detecting an object in an image, the method comprising:
    selecting, using a processor, a macroscopic scan mode for a small number of divided regions or a microscopic scan mode for a large number of divided regions according to a complexity of a background including an object to be detected;
    dividing, using a processor, an input image into one or more regions according to the selected scan mode, wherein the dividing process comprises determining whether or not there is a non-uniform region in previously divided regions and continuously and hierarchically dividing the non-uniform region until all of the divided regions are determined to have a uniform characteristic;
    merging, using a processor, adjacent regions having similar characteristics among the divided regions;
    extracting, using a processor, a search region from the divided or merged regions by excluding a region having a high probability that the object to be detected does not exist;
    extracting, using a processor, feature data including a feature vector for detecting the object in the search region; and
    detecting, using a processor, the object in the search region using the extracted feature data.

2. The method of claim 1, wherein merging the adjacent regions includes merging the adjacent regions having a difference in the similar characteristics of the adjacent regions equal to or smaller than a threshold value.

3. The method of claim 1, wherein the uniform characteristic comprises at least one selected from among a pixel, an average, a variance, a moment, a color and a texture.

4. The method of claim 2, wherein the similar characteristic comprises at least one selected from among a pixel, an average, a variance, a moment, a color and a texture.

5. The method of claim 1, wherein an average and a variance, which are setting variables for image division, are set to relatively large values in the macroscopic scan mode, and are set to relatively small values in the microscopic scan mode.

6. The method of claim 1, wherein extracting the search region includes excluding a predetermined number of regions from the divided or merged regions in decreasing order of number of pixels.

7. The method of claim 1, wherein extracting the feature vector includes extracting the feature vector of the search region using a histogram of oriented gradient (HOG) algorithm.

8. The method of claim 1, wherein detecting the object includes distinguishing between the object and a non-object through a classifier generated using an AdaBoost algorithm.

9. A system for detecting an object, comprising:
    a computer, the computer comprising:
    a scan mode selector configured to select a macroscopic scan mode for a small number of divided regions or a microscopic scan mode for a large number of divided regions according to a complexity of a background including an object to be detected;
    a region divider configured to divide an input image into one or more regions according to the selected scan mode, wherein the divided regions are determined to be uniform or non-uniform and a non-uniform region is divided continuously and hierarchically until all of the divided regions are determined to have a uniform characteristic;
    a region merger configured to merge adjacent regions having similar characteristics among the divided regions;
    a region extractor configured to extract a search region from the divided or merged regions by excluding a region having a high probability that the object to be detected does not exist;
    a feature data extractor configured to extract feature data including a feature vector for detecting the object in the search region; and
    an object detector configured to detect the object in the search region using the extracted feature data.

10. The system of claim 9, wherein the region merger is configured to merge the adjacent regions having a difference in the similar characteristics equal to or smaller than a threshold value.

11. The system of claim 9, wherein the uniform characteristic comprises at least one selected from among a pixel, an average, a variance, a moment, a color and a texture.

12. The system of claim 10, wherein the similar characteristic comprises at least one selected from among a pixel, an average, a variance, a moment, a color and a texture.

13. The system of claim 9, wherein the scan mode selector is configured to set an average and a variance, which are setting variables for image division, to relatively large values in the macroscopic scan mode, and to relatively small values in the microscopic scan mode.

14. The system of claim 9, wherein the region extractor is configured to exclude a predetermined number of regions from the divided or merged regions in decreasing order of number of pixels.

15. The system of claim 9, wherein the feature data extractor is configured to extract the feature vector of the search region using a histogram of oriented gradient (HOG) algorithm.

16. The system of claim 9, wherein the object detector is configured to distinguish between the object and a non-object through a classifier generated using an AdaBoost algorithm.

* * * * *